Oct. 17, 1944.  T. R. SMITH  2,360,734

COMPRESSIBLE SEALING RING

Filed Jan. 29, 1943

INVENTOR.
Thomas R. Smith,
BY
Parkinson & Lane
Attys

Witness:
Chas. R. Koursh.

Patented Oct. 17, 1944

2,360,734

UNITED STATES PATENT OFFICE 2,360,734

COMPRESSIBLE SEALING RING

Thomas R. Smith, Newton, Iowa, assignor to The Maytag Company, Newton, Iowa, a corporation of Delaware Application January 29, 1943, Serial No. 473,956

1 Claim. (Cl. 288—4)

The present invention relates to a sealing ring or packing adapted to seal between a pair of relatively movable parts, and especially to a sealing ring composed of a resilient, rubber-like packing having a core of relatively low durometer hardness and an outer enclosing shell or covering of a relatively high durometer hardness, adapted to give the sealing ring a high resiliency yet provide and retain a wearing surface which is relatively hard and highly resistant to wear and extrusion.

The invention further comprehends a novel sealing element composed wholly of a resilient moldable material such as natural or compounded synthetic rubber in which the core or central portion is of a resiliency or flexibility greater than that of the outer enclosing shell or envelope. This shell or envelope which forms the contacting and sealing surface, has excellent wearing characteristics, a relatively low coefficient of friction and resists extrusion between the surfaces being sealed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
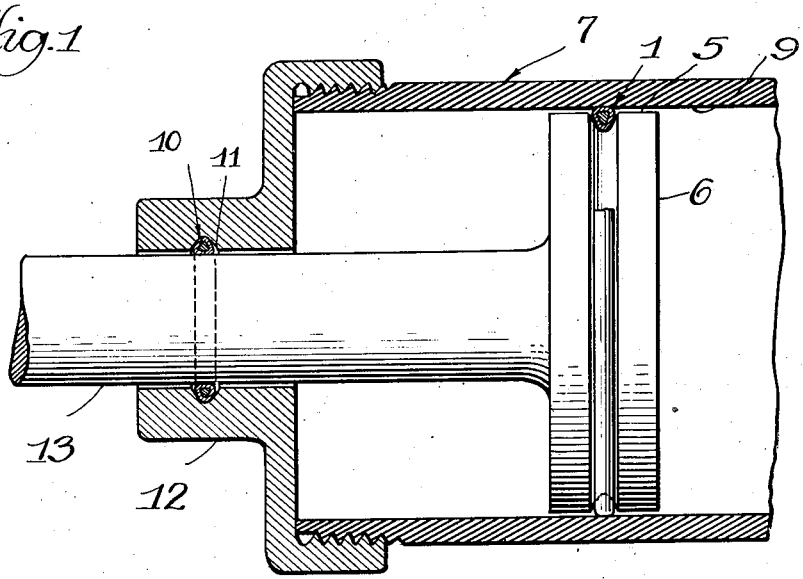
Figure 1 is a view in vertical cross section through a cylinder and showing the novel construction of sealing ring or packing associated with the piston and piston rod.
Figure 2:
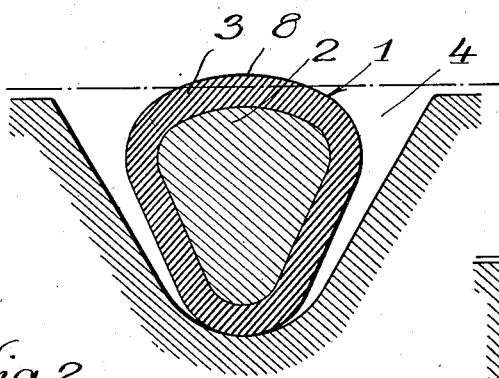
Figure 2 is an enlarged view in vertical cross section through the sealing ring and recess in which it is positioned.

The novel construction of sealing ring or packing as shown in the illustrative embodiment of Figures 1 and 2, comprises a substantially wedge-shaped member 1 having a central portion or core 2 completely enclosed within an outer layer or envelope 3. The core and encompassing layer or envelope are composed wholly of a resilient material suitable for sealing a fluid under pressure and excellent results have been secured by forming each of a natural or compounded synthetic rubber or like moldable material, but with the outer layer which forms the sealing face, of relatively greater hardness and more resistant to wear and extrusion between the surfaces being sealed than the more flexible or resilient inner core. Excellent results have been secured by making the central portion or core of a low durometer hardness of approximately 35 to 50 durometer, and the outer layer, shell or envelope varying between approximately 60 and 90 durometer.

Referring more particularly to the construction shown in Figures 1 and 2, the sealing ring or packing 1 is disclosed as of substantially wedge-shape and positioned within an annular substantially V-shaped recess or groove 4, provided in the circumferential wall 5 of a piston 6 operating in a cylinder 7. In this form of the invention, the cross section of the groove or recess is somewhat greater than the cross section of the ring and the latter is shown as of the external type with its sealing face 8 in sealing contact with the inner wall 9 of the cylinder. A sealing ring or packing 10 of similar construction but of the internal type is shown as positioned within a substantially V-shaped groove or recess 11 in the head or end cap 12, with the sealing face of the ring in wiping and sealing contact with the circumference of the piston rod 13.

Figure 3:
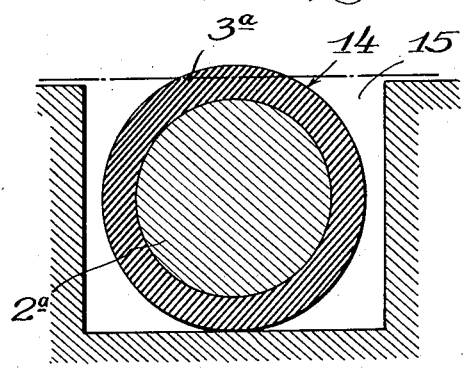
Figure 3 is a view similar to Figure 2 but showing an alternate form of sealing ring positioned within a channel.

Figure 3 discloses an alternate form of sealing ring or packing 14. In this form of the invention, the ring comprising a core 2ª and an outer layer or envelope 3ª of similar material and durometer hardness as that shown in Figure 2 is of substantially circular cross section and shown positioned within a channel 15. In the embodiment of each of the figures, the width or cross section of the recess or channel is such as to permit the ring or packing to shift laterally or pivot and to be compressed as the sealing face is brought into sealing contact with the surface to be sealed.

Having thus disclosed my invention, I claim:

A resilient packing for sealing the space between a pair of relatively movable members, one of which is provided with a substantially V-shaped recess receiving the packing, the packing when assembled in the recess under radial deformation being of substantially wedge-shape with its base in wiping and sealing contact with the other member and its sides disposed at an angle substantially less than the angle formed by the sides of the recess, the packing comprising a core and an outer layer of substantially uniform thickness completely enclosing the core, the core having a high degree of resiliency and the outer layer being of harder consistency and more resistant to wear and extrusion than the core and forming the sealing surface between the members.

THOMAS R. SMITH.